United States Patent [19]
Duewel

[11] 4,222,812
[45] Sep. 16, 1980

[54] HOT AIR EDGE BANDING MACHINE

[75] Inventor: Ronald E. Duewel, West Dundee, Ill.

[73] Assignee: LOF Plastics, Inc., Detroit, Mich.

[21] Appl. No.: 920,241

[22] Filed: Jun. 29, 1978

[51] Int. Cl.² .................................................. B32B 35/00
[52] U.S. Cl. ..................................... 156/497; 156/499; 156/510
[58] Field of Search ............... 156/320, 322, 466, 497, 156/499, 577, 578, 574, 579, 510

[56] References Cited

U.S. PATENT DOCUMENTS

| | | | |
|---|---|---|---|
| 3,265,547 | 8/1966 | Selbe | 156/499 |
| 3,671,364 | 6/1972 | Guinan | 156/574 |
| 3,753,832 | 8/1973 | Veneziale | 156/322 |
| 3,879,254 | 4/1975 | Hay | 156/499 |
| 3,900,362 | 8/1975 | Schaffer | 156/574 |
| 3,988,192 | 10/1976 | Landis et al. | 156/322 |
| 4,067,762 | 1/1978 | Rhoads | 156/499 |

FOREIGN PATENT DOCUMENTS 50-36854 of 1975 Japan .......................................... 156/497
481393 of 1975 U.S.S.R. ..................................... 156/497

OTHER PUBLICATIONS

Ney Sales Brochure, G. Ney, Inc., Feb. 1976.

*Primary Examiner*—Caleb Weston
*Attorney, Agent, or Firm*—Collins, Oberlin & Darr

[57] ABSTRACT

A device for applying a decorative preglued banding material to the edges of a panel including, in suitably mounted operative relationship, a holder for dispensing the banding material from a continuous reel, an air heater with flow control means for directing heated air against the hot melt adhesive on the banding material, a shoe and rotatable star wheels for guiding the band through the heating zone, an adjustable spindle by means of which an appropriate band can be centered upon and pressed against panel edges of different widths, and marking and severing means for terminating the band at a preselected point along the panel edge.

9 Claims, 8 Drawing Figures

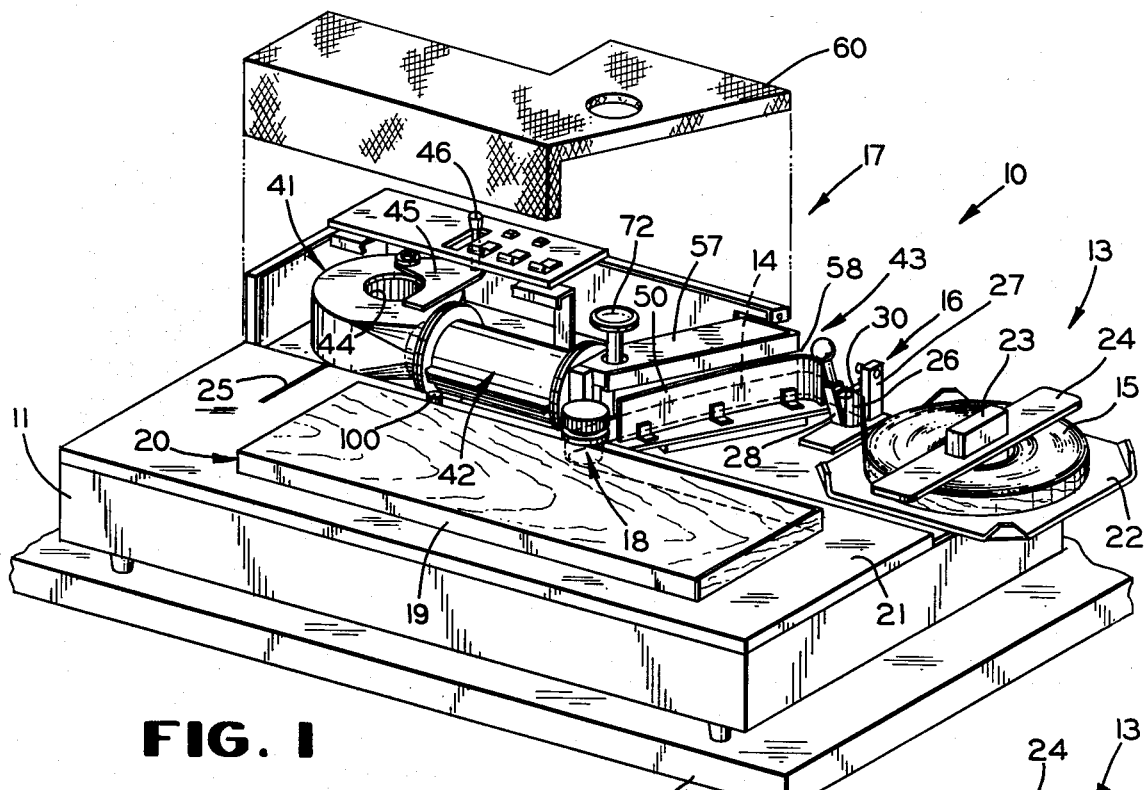
FIG. I
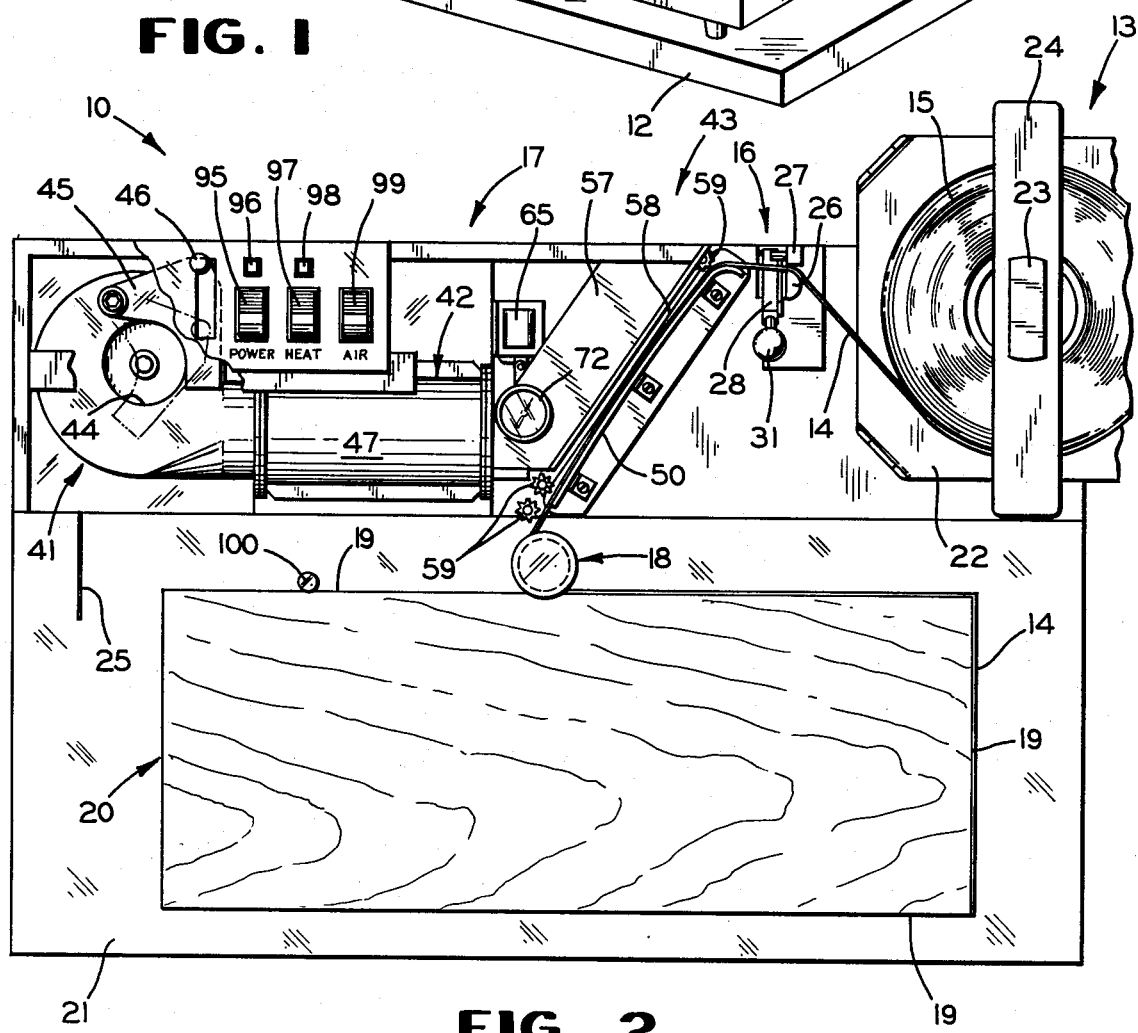
FIG. 2

HOT AIR EDGE BANDING MACHINE

BACKGROUND OF THE INVENTION

1. Field Of The Invention

The present invention relates broadly to the application of a decorative band to the edges of panel material, and more specifically to an improved apparatus for heating the hot melt adhesive on any of various widths of such banding material and accurately applying the band to the edge of the panel precisely from the desired beginning point to the ending point.

2. Description Of The Prior Art

The raw edges of various types of panels, including sawed boards, plywood and composition materials, have heretofore been covered with strips or bands of material in order to conceal irregularities in the surface and present a durable edge with a finished, pleasing appearance. Such covering of edges is old and well known in the art, and numerous ways have been proposed for affixing the band of edging material to the board or panel. Thus, for example, metal strips, thin strips of wood or wood veneer, and plastic moldings have been affixed by conventional screw and nail type fasteners, and such strips as well as bands of a polyester resin impregnated paper sheet having a decorative appearance, have been affixed by various adhesives. Use of so-called wet adhesives for this purpose, that is, adhesives which are applied in liquid form immediately prior to application of the edge band and which require drying or curing time, is time consuming and expensive. Edge bands having a tacky material such as a rubber base adhesive, covered by a paper backing or separating strip which is removed just prior to installation, have also been proposed. They likewise have not been found completely satisfactory in that they are not readily adaptable to small scale machine application as is desirable for small job shops.

One available edge banding material which has been found particularly suitable for application to panels of various shapes and thicknesses by relatively unskilled workers is preglued with a coating of high viscosity hot-melt glue. One such edging material is described in U.S. Pat. No. 3,730,823 to Veneziale. As therein explained, the glue is heated immediately prior to application of the edge band to a temperature at which it becomes melted and, while the glue is thus melted, the banding material is pressed against the edge of the panel and becomes securely bonded thereto almost instantaneously as the glue cures.

In using such edge banding material it is, of course, necessary to heat the glue to its molten state and then almost simultaneously properly align and press the heated band into engagement with the edge of the panel. A number of machines have been proposed for applying such bands. For example, U.S. Pat. No. 3,753,832 to Veneziale describes a machine wherein the pre-glued edge band is withdrawn from a continuous roll over and in contact with a heated platen. The edge of the panel is then brought into contact with the heated band and together they are moved past associated pressure and finishing rollers which press the glued edge band surface into intimate contact with the surface of the panel edge so that the bond therebetween is completed. Another machine is described in a brochure distributed by G. Ney Inc., 3 Kennedy St., Hackensack, N.J. 07601. This particular machine is said to employ heated air to suitably raise the temperature of the adhesive as the band is withdrawn from a coil of banding material. Rubber rollers press the band into engagement with the panel edge and insure intimate contact and bonding therebetween.

The prior art devices have not proven entirely satisfactory in some cases, however. Thus, devices employing a heated platen tend to scorch the banding material and cause bubbling of the adhesive if the period of contact is for any reason excessive. They therefore require that the workpiece be moved through at a more-or-less constant rate, requiring a skilled operator. The procedure cannot be readily stopped and started nor can the speed be materially varied in applying edge banding to workpieces with edges having varying degrees of complexity. The prior art hot air edge banding devices likewise did not provide the desired degree of temperature control and consequent flexibility with regard to starting, stopping and varying the rate of feed. Difficulty was also encountered in guiding the edge band, while the glue was melted, into proper alignment with the panel edge and severing the band from the continuous roll point such that it terminated at precisely the desired point along the panel.

SUMMARY OF THE INVENTION

In accordance with the present invention there is provided a machine for dispensing preglued edge banding material of any selected width from a continuous supply reel, heating the hot-melt adhesive on the band to the consistency necessary for bonding to a surface, aligning the band with the edge of a panel and pressing the band into engagement with the panel edge. The adhesive is heated by a stream of hot air, and the rate of flow and temperature of the hot air can be closely controlled to permit variation of the rate at which the band is applied, as well as stopping and starting at any time, without blistering, scorching or deforming of the banding. The machine includes an adjustable spindle for aligning and applying the banding which can be quickly, easily and securely set to accommodate bands of different widths and panels of corresponding thicknesses. A measuring and severing system coordinated with the spindle permits the operator to sever the banding from the continuous reel so that it will end at precisely the desired point along the panel without leaving a gap in the banding or necessitating trimming of a loose end.

It is, therefore, a primary object of the present invention to provide an improved device for applying a preglued banding material to the edge of a panel.

Another object of the invention is to provide such a device having a controllable hot air supply for selectively applying heat to the hot melt adhesive on the banding.

Another object of the invention is to provide such a device in which the adhesive is melted by directing heated air thereagainst prior to application of the banding material to the panel.

Another object is to provide such a device which can be quickly and easily set to accurately apply edge banding strips of different widths.

Still another object is to provide such a device which is relatively inexpensive to produce, trouble free, safe and can be satisfactorily operated by relatively unskilled operators.

Other objects and advantages will become more apparent during the course of the following description when taken in connection with the accompanying drawings.

BRIEF DESCRIPTION OF THE DRAWINGS

In the accompanying drawings, wherein like numerals are employed to designate like parts throughout:

FIG. 1 is a perspective view, partially exploded, of an apparatus constructed in accordance with the invention;

FIG. 2 is a plan view, with parts broken away, of the apparatus of FIG. 1;

DESCRIPTION OF THE PREFERRED EMBODIMENT

Figure 3:
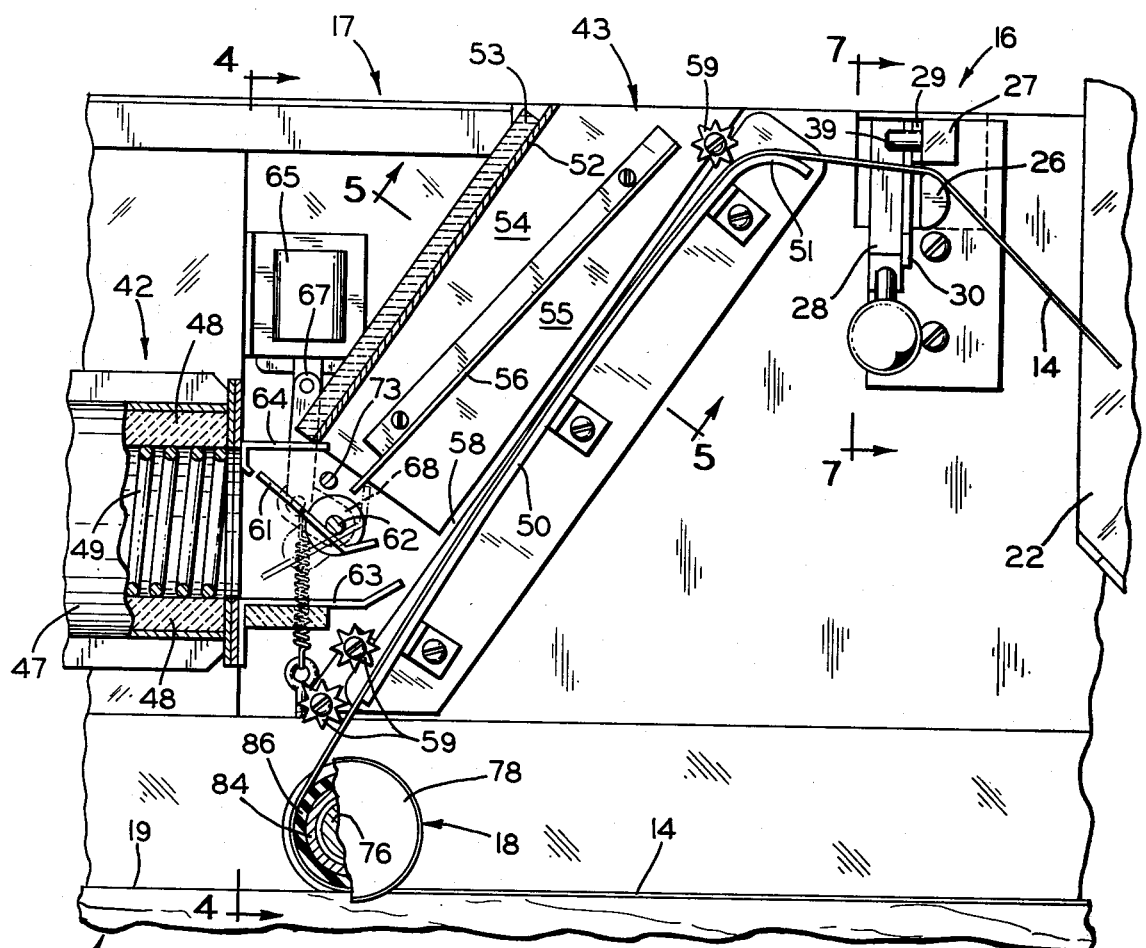
FIG. 3 is an enlarged fragmentary plan view, with parts broken away, of the heating section of the apparatus.
Figure 4:
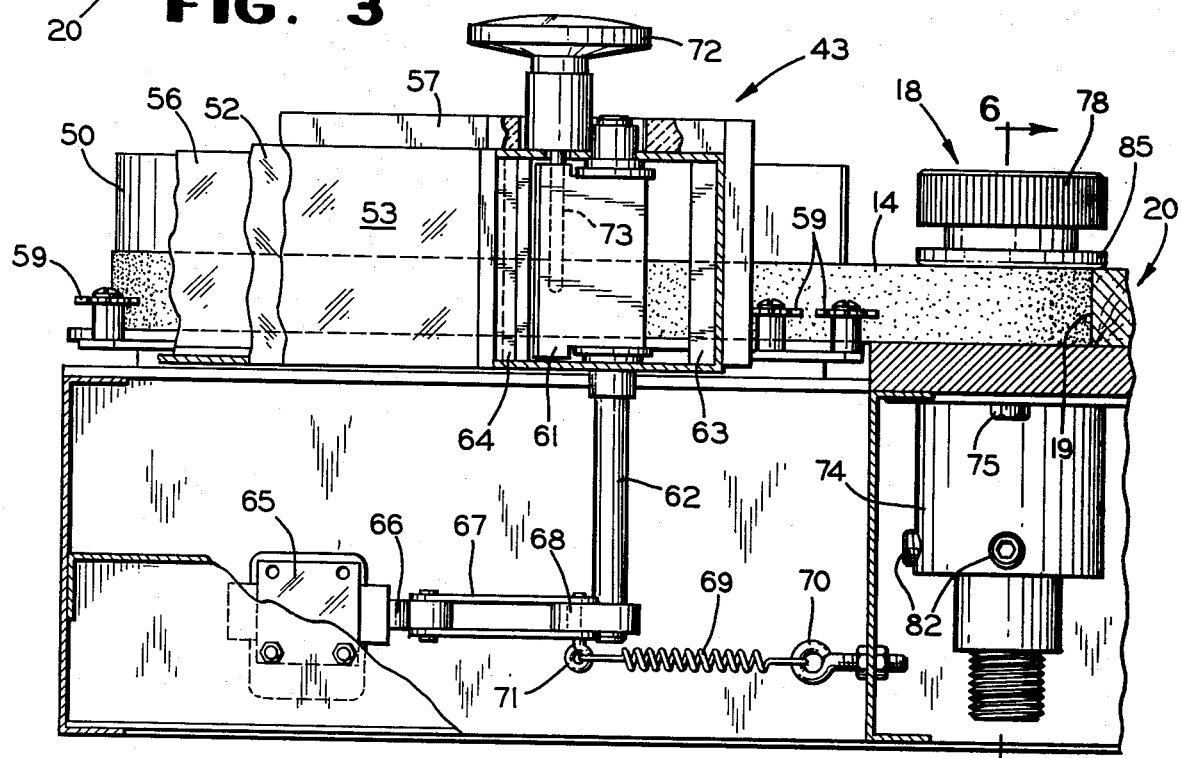
FIG. 4 is a fragmentary elevational view taken substantially along line 4—4 of FIG. 3.
Figure 5:
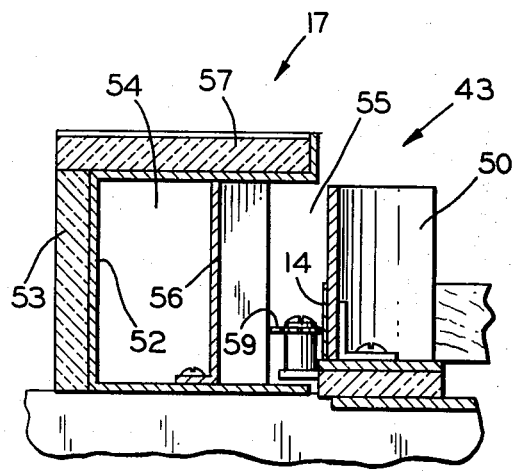
FIG. 5 is a fragmentary vertical section taken substantially along line 5—5 of FIG. 3.

Referring now to the drawings, there is illustrated generally at 10 in FIGS. 1 and 2 an edge banding machine embodying the invention. The machine is relatively lightweight so as to be portable, and includes a base 11 adapted to be supported upon a suitable work surface 12. Mounted upon the base are a reel mechanism 13 for supplying a web 14 of pre-glued banding material from a continuous roll 15, a cut-off mechanism 16, a heating mechanism 17 for heating the hot melt adhesive on the banding material, and an adjustable spindle 18 for aligning and pressing the banding material into engagement with the edges 19 of a panel 20 which is to be edge banded. The base 11 has a working deck 21, preferably formed of a dimensionally stable material which will withstand elevated temperatures without warping or cracking.

The reel mechanism 13 includes a stationary support plate 22 upon which the roll 15 of edge banding material rests. A post 23 having a configuration adapted to extend through the open interior of the roll and maintain it in place extends upwardly from the support plate so that the roll can be rotated thereabout as the web 14 of banding material is removed. A hold down bar 24 having a central opening complementary to the cross sectional configuration of the post 23 slips over the post and rests on top of the roll. It thereby acts as a brake and restrainer to prevent the banding material from prematurely unrolling while permitting the roll to rotate about its axis as material is withdrawn from the roll.

Figure 7:
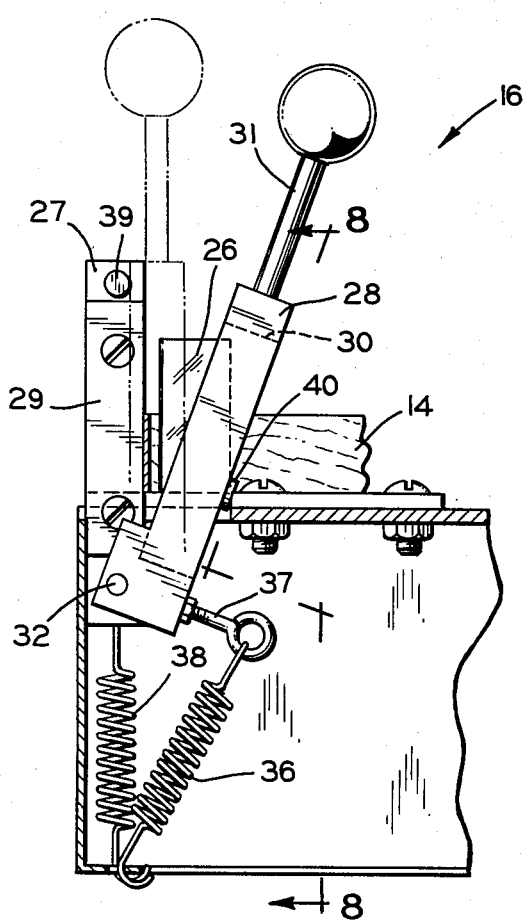
FIG. 7 is an elevational view, partially in section, taken substantially along line 7—7 of FIG. 3 and illustrating the cut-off mechanism.
Figure 8:
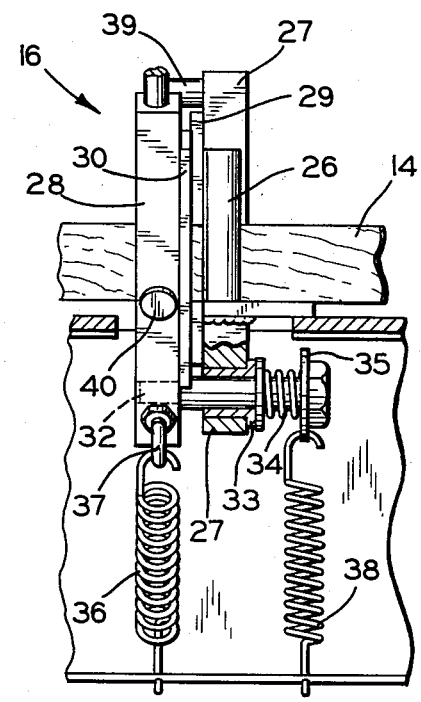
FIG. 8 is an elevational view of the cut-off mechanism taken substantially along line 8—8 of FIG. 7.

The web 14 of banding material passes through the cut-off mechanism 16 as it is withdrawn from the reel mechanism 13 and, at an appropriate point along the web determined by bringing the termination point on the panel 20 into registry with an indexing mark 25 (FIGS. 1 and 2) on the working deck, the cut-off mechanism is operated to sever the web from the continuous roll 15. To this end, the cut-off mechanism 16 is affixed to the base 11 and includes an upstanding guide member 26 about which the web 14 is deflected for passage from the roll 15 through the mechanism 16 between a mounting post 27 and a pivoted lever 28 thereof. The mounting post carries a stationary blade 29, while the lever 28 carries a shear blade 30. The lever has a handle 31 affixed to one end and, as best seen in FIGS. 7 and 8, is pivotably mounted at the other end by means of an axle 32. The axle is journalled in a bushing 33 received in an opening in the lower end of the mounting post 27. In order to ensure that the shear blade 30 on the lever 28 will move closely adjacent and in a plane parallel to the stationary blade 29, a compression spring 34 is provided between the bushing 33 and a retainer ring 35 on the axle 32. A tension spring 36, attached at one end to an adjustable arm 37 on the lever 28 and at its other end to the structure of the base 11, urges the lever to the normally open or non-cutting rest position shown in full line in FIG. 7. A second tension spring 38, connected between the retainer ring 35 and the base structure at the opposite end of the axle 32, tends to balance the torque created by the tension spring 36 on the axle and prevents it from binding in the bushing 33. It likewise prevents the shear blade 30 from being separated from the stationary blade 29 as the lever is moved from the open to the closed position, shown in broken lines in FIG. 7, during the cutting or severing operation. A stop member 39 is provided on the mounting post 27 for limiting the travel of the lever 28 at the end of the cutting stroke, and a resilient pad 40 is provided on the rear of the lever at the point where it engages the base structure in the rest position.

The heating mechanism 17, by means of which hot air is selectively provided to heat the adhesive on the web 14 of banding material as it is drawn therethrough, includes a blower 41 (FIGS. 1 and 2) for directing air through an air heater 42 and then to a heating chamber 43 for contact with the web. More particularly, the blower 41 is of a conventional centrifugal type having an inlet opening 44 whose area may be varied by a pivotably mounted valve plate 45 controlled by a handle 46 for a purpose to be hereinafter described.

The air heater 42 comprises a tubular member 47 connected to the outlet of the blower 41, whose interior is provided with a refractory insulating lining 48. An electrical resistance heating element 49 inside the lining is connected to a source of electrical energy (not shown) so that when energized, the element will operate to raise the temperature of air forced through the heater.

As best seen in FIG. 3, from the tubular member 47 the heated air enters the heating chamber 43 where it may selectively be directed into contact with the surface of the web 14 containing the adhesive, or away from the adhesive containing surface. To this end, the heating chamber 43 includes a front wall or shoe 50 along which the web of banding material travels from the guide member 26 to the spindle 18. The shoe may be gently curved along its length and has a sharply curved end section 51. It thus defines the desired path from the guide member to the spindle so as to minimize the overall dimensions of the machine and yet provide sufficient contact time between the heated air and web to activate the adhesive. The back of the heating chamber is defined by a rear wall 52 having a layer of insulation 53 thereon to prevent overheating of the mechanism behind it. The chamber is further divided into a bypass section 54 and a working section 55 by divider 56 extending longitudinally thereof. A roof 57 of suitable insulating material extends over the rear wall and divider, stopping short of the front wall so as to provide an opening 58 (FIGS. 1 and 2) through which the web 14 may be inserted or threaded through the heating chamber. Freely rotatable star wheels 59 are mounted at strategic locations to assist in threading and guiding the web through the working section at such times as sufficient tension may not be maintained in the web to hold it against the wall or shoe 50. Due to their point contact with the adhesively coated surface, the star wheels do not tend to become coated with adhesive and consequently inoperative as would conventional flat rollers. A porous safety shield 60 (FIG. 1) covers the heating mechanism 17 to prevent accidental contact with a hot surface.

Since in any edge banding operation there are periods between panels and at the beginning of the application to each panel when the banding web will not be immediately applied to the panel edge, the invention provides for the heated air to be deflected away from the web until such time as heating of the adhesive is desired. Thus, there is provided at the entrance to the heating chamber 43 a damper 61 mounted upon a suitably journalled shaft 62 so that it can be swung between the position shown in solid lines in FIG. 3 to direct heated air through the working section 55, and the position shown in broken lines to direct a majority of the heated air through the bypass section 54 of the heating chamber 43. Forward and rear deflectors 63 and 64, respectively, are provided at the end of the air heater 42 to cooperate with the damper and assist in channeling the air through the appropriate section of the heating chamber.

Positioning of the damper is controlled by means of a solenoid 65 whose armature 66 is connected by suitable linkage 67 to an arm 68 on the shaft 62. A tension spring 69 is connected at one end to an adjustable eye bolt 70 carried by the framework of the base 11, and at its other end to a hook 71 on the arm 68. Thus, as will be hereinafter more fully explained, when the solenoid is not actuated to retract the armature and move the damper 61 to the position for directing heated air to the working section 55 as shown in full lines in FIG. 3, the tension spring will urge the damper to the normal at-rest bypass position as shown in broken lines in FIG. 3.

In order to insure that the adhesive on the web 14 will be heated to the appropriate temperature for proper application of the banding material, it is desirable to be able to observe the temperature of the heated air which is to be directed against the web. Accordingly, there is provided a temperature gauge 72 whose sensing probe 73 extends into the entrance passageway of the bypass section 54 of the heating chamber. The operator can thus readily observe and adjust the temperature of the air going through the bypass section before switching the damper to begin application of the edge banding web.

Figure 6:
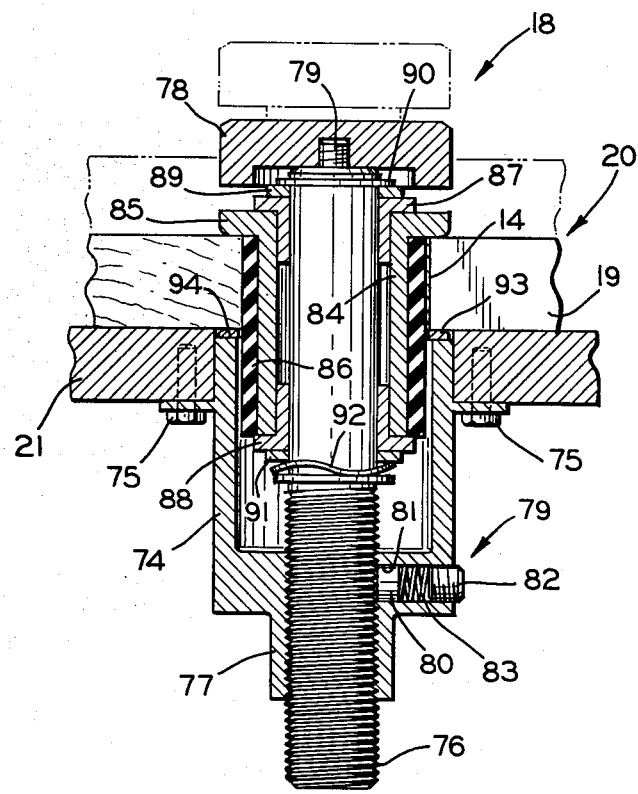
FIG. 6 is a vertical section through the spindle of the apparatus, taken substantially along line 6—6 of FIG. 4.

The spindle 18, as previously described, is adapted to accurately and firmly apply the web 14 of banding material to the edges 19 of panels of different thicknesses. As illustrated in the full and broken line positions of FIG. 6, it can be readily adjusted to accommodate these different thicknesses and, when set, will not drift or vary from the set position even over extended periods of use. More particularly, and as best seen in FIG. 6, the spindle assembly includes a tubular housing 74 mounted beneath, and extending through an opening in, the working deck 21 as by lag screws 75. A post 76 is threaded at its lower end through a boss 77 of the tubular housing, and a knurled grip 78 is mounted at the upper end of the post as by being threaded, pressed or otherwise affixed to a projection 79 thereon. Thus, by turning the knurled grip in the appropriate direction, the post 76 can be raised or lowered relative to the working deck 21. In order to prevent inadvertent movement of the post and permit adjustment of the rotational effort required for raising or lowering it, one or more frictional retarders 79 are provided in the base of the tubular housing. The retarder includes a pad 80 of a suitable friction material received within an opening 81 in the base of the tubular housing and bearing against the threads of the post 76. An adjusting screw 82 threaded into the opening urges a compression spring 83 against the friction pad. Thus, by turning the adjusting screw or screws in or out, the relative ease with which the post 76 can be turned is regulated.

Mounted upon the post 76 is a spool 84 having a top flange 85 adapted to extend over the top of the panel edge 19 when the spindle is properly set. The spool is of sufficient height to accommodate panels of the desired thickness when the spindle is fully raised. When the spindle is lowered, its lower section recedes into the tubular housing 74 beneath the working deck. A sleeve 86 of heat resistant, resilient material is provided over the spool surface for actual contact with the web 14 of banding material to serve as a pressure member in urging the web against the edges 19. The spool is mounted upon the post by means of top and bottom bushings 87 and 88, respectively, so that it is freely rotatable to move with the panel edge and web 14 as they are moved therepast. The top bushing 87 is backed up against a washer 89 held by a restrainer 90 on the post 76, while the bottom bushing 88 is urged upwardly against the lower end of the spool by a washer 91 and a spring lock 92 on the post. Thus, the spool is held securely against endwise movement along the post.

A slip ring 93 surrounds the resilient sleeve 86 and is adapted to be received within a recess 94 at the top of the tubular housing 74 so that its top is at the optimum level, substantially flush with or slightly above the top surface of the working deck 21. The slip ring may rotate with the spool and sleeve and can also be moved longitudinally along the sleeve as the spindle is raised or lowered so as to remain in the recess and serve as the lower aligning means for the web 14 regardless of its width. Thus, the panel edge and web are always received within a working recess defined by the flange 85 of the spool and the slip ring 93, which rotate as a unit and insure alignment of the web along the edge.

In using the apparatus, an operator first selects a continuous roll 15 of edge banding material having the proper width for the panel to be edge banded and installs it on the reel mechanism 13. The spindle 18 is adjusted to accommodate the particular panel and web between the top flange 85 and slip ring 93. By means of a switch 95 the power to the machine is turned on, illuminating an associated light 96 which indicates the machine is activated. This also starts the blower 41 which is wired to run whenever the power is on, thus preventing inadvertent overheating of the machine. A second switch 97 is moved to the "on" position, illuminating an associated indicator light 98 and activating the heating element 49. During this time the damper 61 remains in the normal, bypass position so that heated air is directed through the bypass section 54 of the heating chamber 43. The gauge 72 indicates the temperature of the air in the heating chamber, and the valve plate 45 is manipulated by means of the handle 46 to vary the size of the inlet opening 44 and thereby achieve proper air temperature for suitably heating the particular web and adhesive combination to be employed.

The web 14 is threaded through the cut-off mechanism 16 and the threading opening 58 between the front wall or shoe 50 and the star wheels 59, with its leading edge remaining within the working section 55. When proper air temperature is reached as indicated by the gauge 72, a third or "air" switch 99 is operated to activate the solenoid 65 and move the damper 61 from the bypass to the working position, whereby the heated air is directed into the working section 55 against and along the adhesively coated surface of the web 14. For ease of operation and to free the hands of the operator, it is contemplated that an alternate foot switch (not shown) may also be provided in conjunction with the hand switch 99 for operating the damper 61.

When the adhesive has melted, the leading end of the web is brought into registry with the desired starting point on the panel, generally a corner, and the web and panel edge are pressed against the resilient sleeve 86 between the top flange 85 and slip ring 93 of the spindle. As seen in FIGS. 1 and 2, the panel and web are advanced, along the edges and around the corners, through the working recess of the spindle with the assistance of an aligning guide 100. During this progression, when the point where the web is to end on the panel reaches the indexing mark 25, the cut-off mechanism 16 is operated to sever the web. The edge banding material then ends at precisely the desired point to provide a completely edge banded panel without the necessity of subsequent trimming.

It is to be understood that the form of the invention herewith shown and described is to be taken as a preferred embodiment of the same, but that various changes in the shape, size and arrangement of parts may be resorted to without departing from the spirit of the invention.

I claim:

1. In apparatus for applying a continuous decorative band of material having a hot melt adhesive coating on a surface thereof to the edges of a panel, comprising a working deck upon which the panel rests for manual manipulation in applying the band, means providing a continuous supply of the band, means for severing a section of the band from the continuous supply, means for selectively directing heated air against the adhesively coated surface of said band for melting said adhesive, including a heater through which air is blown and a heating chamber receiving the heated air, said heating chamber comprising a bypass section, a working section through which said band passes, and damper means for selectively directing the heated air to either of said sections, and spindle means past which the panel edge and band are moved for aligning and pressing the band against the panel edge while the adhesive is melted, said spindle including means defining a working recess of adjustable height to accommodate panels of different thicknesses.

2. An apparatus as claimed in claim 1, including a shoe defining one wall of said working section defining a path along which said band is moved through said working section for exposure to the heated air, and at least one freely rotatable star wheel positioned adjacent said shoe and the adhesive coated surface of said web for guiding said web through said working section along said shoe.

3. An apparatus as claimed in claim 1, including means normally urging said damper to an at rest position whereat the heated air is directed through said bypass section and means operable at selected times to swing said damper to a second position at which the heated air is directed through said working section into contact with said adhesive coated surface.

4. An apparatus as claimed in claim 1, including a temperature sensing means for indicating the temperature of the heated air moving through said bypass section.

5. An apparatus for applying a continuous decorative band of material having a hot melt adhesive coating on a surface thereof to the edges of a panel, comprising a working deck upon which the panel rests for manual manipulation in applying the band, means providing a continuous supply of the band, means for severing a section of the band from the continuous supply, means for selectively directing heated air against the adhesively coated surface of said band for melting said adhesive, and spindle means past which the panel edge and band are moved for aligning and pressing the band against the panel edge while the adhesive is melted, said spindle comprising means defining a working recess of adjustable height to accommodate panels of different thicknesses including a spool freely rotatable about a vertical axis, an outwardly extending flange at the top of said spool, and a slip ring surrounding said spool and rotatable therewith, said flange and said slip ring defining said working recess for aligning said band with said panel edges.

6. An apparatus as claimed in claim 5, including an indexing mark on said working deck along the path traversed by the panel edge to which the band is to be applied, said mark being positioned so that when the desired end point for the band on the panel edge is in registry therewith, the point at which the band is to be severed from said continuous supply will be at said severing means.

7. An apparatus as claimed in claim 5, including a vertical post and means journalling said spool upon said post for said free rotation, said post being mounted for movement up and down relative to said working deck to adjust the height of said working recess.

8. An apparatus as claimed in claim 7, including a tubular housing mounted in said working deck, said post being threadedly received at its lower end in said tubular housing whereby rotation of said post raises and lowers said post and spool thereon.

9. An apparatus as claimed in claim 8, including a resilient sleeve surrounding said spool, said slip ring being movable longitudinally of said sleeve as said post and spool are raised and lowered whereby its top edge remains at the optimum level substantially flush with or slightly above the top surface of said working deck.

* * * * *